April 19, 1932.     A. PERRENOT     1,854,312
TIRE GROOVING TOOL
Filed Sept. 3, 1930

INVENTOR.
BY Albert Perrenot
Benjamin Webster
ATTORNEY

Patented Apr. 19, 1932

1,854,312

UNITED STATES PATENT OFFICE

ALBERT PERRENOT, OF NEW YORK, N. Y.

TIRE GROOVING TOOL

Application filed September 3, 1930. Serial No. 479,507.

This invention relates to automobile tools and more particularly to tools associated with automobile tires.

The invention has for its objects, among others, first, to provide a tool for quickly and easily making upon a worn automobile tire in situ suction grooves adapted to prevent the automobile from skidding; second, to provide such a tool for hand use; third, to provide such a tool of a size and form as to be easily carried in an automobile kit of tools; fourth, to provide such a tool that may be used with a minimum movement of the wheel about the axle, or in other words that may be used beneath the mud guard with ease and facility; fifth, to provide such a tool that conforms with the surface of a worn tire; sixth, to provide such a tool that is light in weight; seventh, to provide such a tool that is durable in construction; eighth, to provide such a tool adapted for operation with one or two hands; ninth, to provide such a tool that although effective and serviceable it is capable of low-cost manufacture thereby increasing its effective economic utility. Other objects will appear as the description proceeds.

In the simplified form herein illustrated and described the tool is about the size of the heel of a shoe and the handle of about the size of an ordinary carpenter's hammer. A hard wood piece is tapped to provide supports for the heads of pointed conical-shaped steel pins that are both hard and tough. The points of these pins are so fixed in the support that they conform with the usual convex surface of a worn inflated automobile tire, so that when drawn over the tire with pressure the action of the points is substantially uniform. A cap secured to the support holds the pins in fixed position. The cap and the handle are preferably of soft wood.

Figure 1:
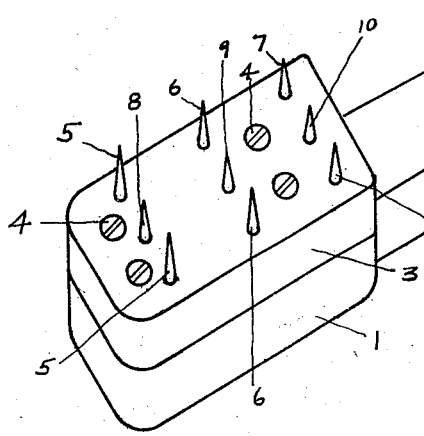
Figure 2:
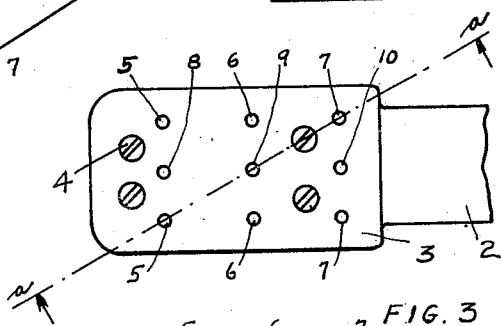
Figure 3:
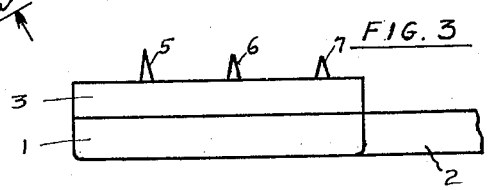
Figure 4:
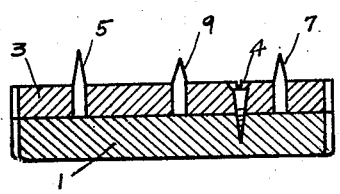
Figure 5:
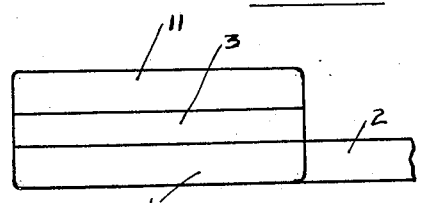
Figure 6:
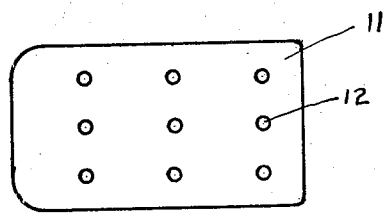

Reference is made to the drawings which are hereby made a part of this specification in which like numerals of reference refer to like parts and in which Figure 1 is a perspective view showing the tire-serrating elements upwards, Figure 2 is a plan view with the handle broken away, Figure 3 is a side view with the handle broken away, Figure 4 is a sectional view on the line a—a of Figure 2 looking in the direction of the arrows, Figure 5 is a side view with the handle broken away showing the tool with the protective cap in place, and Figure 6 is a bottom view of the protective cap, showing holes adapted to receive and protect the serrating steel points.

A base 1 of soft wood and of about the same size as the heel of a man's shoe has connected therewith a wooden handle 2. In use a right-handed man grasps the handle 2 in his right hand and then when needed puts his palm of his left hand on the back of base 1 to quicken the action of the serrating points. A second part 3 is cut from hard wood of the same size as base 1 and wood screws 4 are adapted to secure the parts 1 and 3 firmly together. Before the union is made however nine holes are tapped in the piece 3, each adapted to receive one of the steel pins, 5, 5, 6, 6, 7, 7, 8, 9, and 10. The pins have the same general form being cylindrical in the lower portion fitting in the holes in piece 3 but are of different length so that the points lie in a curved surface symmetrical with the surface of an automobile tire that has been worn smooth. Moreover as seen in Figure 3 steel pins, 5, 6, and 7 in the two outer rows and steel pins 8, 9, and 10 from front to rear decrease in height so that they conform with the normal manual handling of an instrument controlled by a handle in a straightaway pull or push. Moreover if a line be drawn through the points of steel pins 5, 6 and 7 in either of the outer rows or through the points of steel pins 8, 9, and 10 the line forms a concave curve which is substantially the same curve as that across the surface of a worn tire, thereby securing uniform action of the steel pins in their objective action of serrating the surface of the worn tire with suction grooves to prevent the worn tire from skidding on the pavement. Similarly if lines be drawn through the points of steel pins 5, 8, 5 and 6, 9, 6, and 7, 10, 7 convex curves are formed having the object of conforming with the curvature of the tire so that the serrations are uniform.

The steel points are hard and tough and as shown are in the form of cones to produce the greatest strength and durability and also to produce a V-shaped serration series in the surface of the tire. It is also self-evident that the construction affords a backing for the ends of the pins, that is pressure sends them against the upper surface of the base 1 and this surface prevents the steel pins and the points from moving out of the predetermined arrangement of their points in fixed position. That is, if the screws 4 are firmly set the back 1 holds the pins securely against inward movement in the tapped holes of the hard-wood supporting piece 3.

Referring now to Figures 5 and 6 when not in use the steel pin points are protected by a soft-wood cap portion 11 which has holes 12 corresponding in size to the steel pins 5, etc. This cap enables the tool to be packed away in the side compartments among steel tools without risk of having the points bent or blunted or otherwise injured. The steel pins in the soft-wood holes are held securely so that the cap 11 remains in protective position but may be quickly removed to use the tool.

A new automobile tire is provided with ridges and conformations having as an objective riding comfort and security against unanticipated slipping on the pavement. It is obvious that as these ridges and protuberances are worn by use the object of preventing skidding or slipping is automatically defeated. Moreover the life of a tire before being ready for discard is much greater than the life of the ridges or protuberances as effective preventers of skidding or slipping. The automobile user is on the horns of the proverbial dilemma; namely he must either lose a large part of his initial tire investment or he must ride on these tires at increased risk of slipping or skidding. The proportion of accidents due to automobile skidding are a vast proportion of the total as I may more or less authoritatively state from my years of experience as a chauffeur. A tool therefore that enables the automobile owner to utilize all of his tire investment and at the same time renews the ridges and protuberances to form effective suction surfaces against skidding not alone meets a long-felt want but is also a great economic boom to the automobile industry and to the safety and security of the automobile passengers.

Now that I have conceived this invention and have disclosed an embodiment of it other modifications will occur to those skilled in the art and I do not choose to limit myself except as in the appended claims.

I claim:

1. A tool for serrating the surface of an automobile tire, comprising in combination a supporting base and a plurality of sharp conical steel pins mounted thereon and adapted to produce grooves in the surface of a tire that has been worn smooth by drawing said pins across the surface of the worn tire with pressure, said pins being of different length such that a line drawn through three pins in a row at the points forms a concave curve of substantially the same curvature as the transverse curve over the surface of a worn automobile tire.

2. A tool for serrating the surface of an automobile tire to prevent skidding, comprising in combination a supporting base, said supporting base being cut from hard wood and having a plurality of holes therein, a plurality of sharp conically pointed pins in said holes and projecting from the surface of said base to different lengths such that lines through the points of said pins define a surface similar to that of a worn tire, a cap of soft wood secured to said base and having recesses adapted to cover the heads of said pins and secure them in the projected positions, and a handle adapted to operate said tool.

Signed at New York, in the county of New York and State of New York, this twenty-seventh day of August, A. D. 1930.

ALBERT PERRENOT.